May 7, 1963 A. BROSH 3,089,081

DIFFERENTIAL TRANSFORMER

Filed Jan. 14, 1958 2 Sheets-Sheet 1

INVENTOR.
AMNON BROSH

BY Edward M. Farrell

ATTORNEY

May 7, 1963 A. BROSH 3,089,081
DIFFERENTIAL TRANSFORMER
Filed Jan. 14, 1958 2 Sheets-Sheet 2
Fig. 4. PRIOR ART
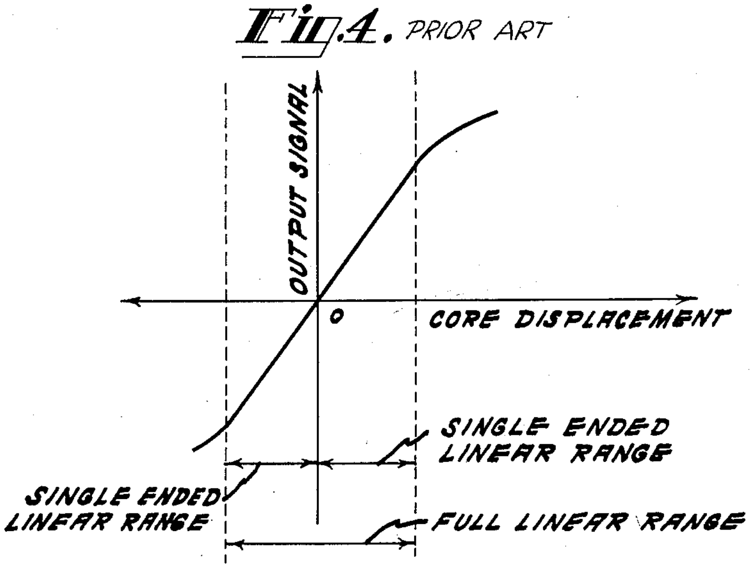
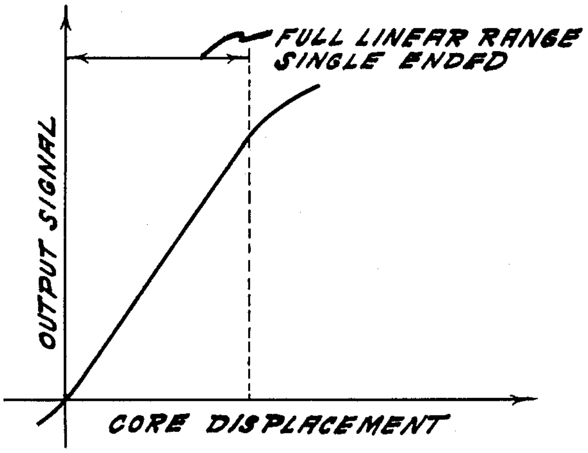
Fig. 5.
INVENTOR.
AMNON BROSH
BY Edward M. Farrell
ATTORNEY United States Patent Office 3,089,081

Patented May 7, 1963

3,089,081

DIFFERENTIAL TRANSFORMER

Amnon Brosh, Philadelphia, Pa., assignor to Schaevitz Engineering, a corporation of New Jersey Filed Jan. 14, 1958, Ser. No. 708,848
10 Claims. (Cl. 323—51)

This invention relates to transducers, and more particularly to transducers of the electro-mechanical or electro-magnetic type.

Transducers involving electro-magnetic or electro-mechanical devices are utilized in a large number of measuring and controlling systems. For example, they are useful in systems involving accelerometers, fluid pressure gages, strain measurement devices, telemetering and other dynamic and static indicating, operating and controlling devices in any situation where the magnitude of a displacement of any type is to be measured. Such a type of electro-magnetic type of transducer is the differential transformer which has a linear output characteristic. The differential transformer has been used extensively for producing an electrical output proportional to the displacement of a body. For example, the differential transformer generally includes a movable core member adapted to be moved in accordance with a measured function. The movable core member is generally disposed between primary and secondary coils of the transformer and provides a path for magnetic flux linking the coils. The secondary coil of the transformer generally includes a pair of substantially similar windings connected in series opposition or bucking relationship.

When the primary coil of the transformer is energized with alternating current, voltages are induced in the two secondary coils. Since the two secondary coils are connected in series opposition, the two voltages induced in the two coils are opposite in phase. Therefore, the net output of the transformer is the difference of the voltages induced in the two secondary coils. For one position of the core member, equal voltages are induced in the two secondary coils resulting in a net zero output voltage. When the core member is positioned for zero output volts, the core is said to be at the balance point or null position.

When the core member is moved from the null position, the voltage induced in the secondary coil towards which the core is moved increases, while the voltage induced in the secondary coil from which the core is moved decreases. These variations in induced voltages are due to the variations in the magnetic flux path between the primary coil and the respective secondary coils caused by the relative movement of the core member. When the core member is thus moved from its null position, a differential output voltage across the output circuit of the transformer results. With proper design, the output voltage from the transformer varies linearly with a change in the core position as long as the core is operating within its linear range. Motion of the core member in the opposite direction beyond the null position produces a similar voltage characteristic across the output circuit of the transformer, but with the phase shifted 180°.

In a conventional differential transformer, the core is generally centrally disposed between the two secondary coils to provide substantially zero output volts. The single ended linear range of such a conventional differential transformer may then be considered as that range of unidirectional core movement which provides a linear output voltage from its null position to the limit of its linear range. Movement of the core from its null position in the opposite direction produces a linear output voltage opposite in phase to the first produced voltage. The full linear range of the conventional differential transformer is therefore twice its single ended linear range. The full linear range may be considered as double ended since two directions of core movement from its null position is necessary to provide a full linear operating range.

In many situations, measurements are involved in which only one direction of core movement from its null position is necessary. While such differential transformers of the type described have proven satisfactory in such situations, present day demands for greater range measurements with smaller and lighter transducers have created situations wherein the size and weight of such conventional transformers are too great for the desired range of measurement.

When only one direction of core movement from a null voltage reference is necessary to measure a function or displacement of a moving body, only the output voltage of a single phase is used. Thus only one-half of the full linear range of the differential transformer is utilized. It is seen, in these cases, that a transformer is necessary which has a full linear range greater than the required single ended linear range.

It is an object of this invention to provide a differential transformer which has a wide output linear range for a single direction of core movement from a null reference position.

It is a further object of this invention to provide means for obtaining a substantially linear single ended output voltage over a wide range from a differential transformer.

It is still a further object of this invention to provide an improved differential transformer having a wide output linear range.

It is still a further object of this invention to provide an improved differential transformer having substantially twice the single ended linear operating range of similar type differential transformers existing heretofore.

It is still a further object of this invention to provide an improved differential transformer in which the single ended useful linear range of operation is increased without adding substantially to the size or cost of such transformers.

In accordance with the present invention, a differential transformer having a single null operating point is provided. Means are associated with the transformer to shift the null operating point of the transformer to provide a wide linear range of operation for core movement.

Other objects and advantages of the present invention will be apparent and suggest themselves to those skilled in the art to which the present invention is related, from a reading of the following specification and claims in conjunction with the accompanying drawing, in which like elements are referred to with like reference numbers:

FIGURE 1 is a schematic diagram of an electrical circuit illustrating one form of an electro-magnetic type of transducer, in accordance with the present invention;

FIGURE 1*a* represents a longitudinal vertical cross section of a physical embodiment of the electro-magnetic transducer illustrated in FIGURE 1;

Figure 3:
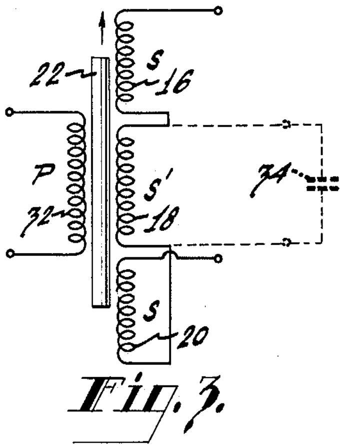
FIGURE 3 is a schematic diagram of an electrical circuit illustrating another form of an electro-magnetic type of transducer, in accordance with the present invention.
Figure 3A:
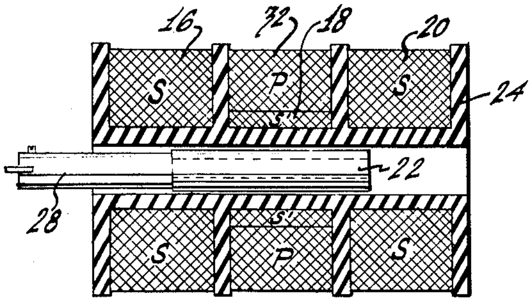

FIGURE 3*a* is a longitudinal vertical cross section of a physical embodiment of the electro-magnetic transducer illustrated in FIG. 3;

FIGURE 4 is a curve illustrating the output voltage of a conventional differential transformer throughout the linear operating range of a core movement; and, FIGURE 5 is a curve illustrating the output voltage of an electro-magnetic transducer embodying the present invention.

Figure 1:
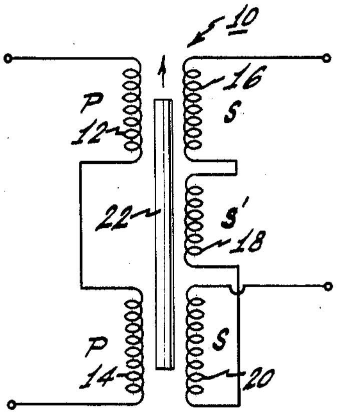

Referring particularly to FIGURE 1, an electro-magnetic type of transducer or differential transformer 10 includes a pair of primary coils 12 and 14 connected in series. The transformer 10 further includes three secondary coils 16, 18 and 20. The secondary coil 18 is serially connected with the secondary coil 16. The secondary coil 20 is connected in series opposition or in a bucking relationship with the secondary coils 16 and 18. A core member 22 is disposed between the primary and secondary coils to provide a magnetic flux path therebetween.

Figure 1A:
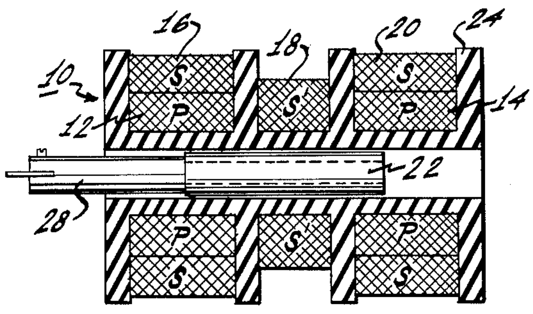

Referring particularly to FIGURE 1*a*, the transformer 10 includes a hollow coil form 24 which is preferably made of a suitable non-magnetic and non-conducting material, such as Bakelite, rubber or the like. The coil form 24 includes a plurality of radial annular fins forming three annular grooves therebetween.

The core or slug member 22 is disposed within the hollow coil form 24 between the primary and secondary coils. A link member 28 of non-metallic material may be mechanically attached to the core 22. The link member and the core are adapted to be shifted axially within the coil form 24. Various types of devices in which it is desired to measure relative degrees of motion may be associated with the link 28.

The primary coils 12 and 14 are wound in the outer annular grooves of the coil form 24. The secondary coils 16 and 20 are also wound in the outer grooves of the coil form 24 concentrically with the primary coils 12 and 14. The secondary coil 18 is wound in the center annular groove. The coils may comprise fine enameled wire.

Due to the magnetic field disposition between the primary and secondary coils, the movable core 22 provides a high degree of linear output in response to very small displacements of the core.

The addition of the secondary coil 18 to the secondary coils 16 and 20 illustrates one way of accomplishing the present invention to achieve results not normally obtainable from differential transformers of the conventional type.

An input A.C. (alternating current) signal may be applied to the primary coils 12 and 14. If the winding 18 were not present as in the conventional type of differential transformer, the combined output signal from the secondary coils 16 and 20 would be a voltage of one of two phases, depending upon which of the secondary coils has the greater voltage developed thereacross. The phase of the A.C. output voltage from the transformer would be indicative of the direction of movement of the core 22. The amplitude of the combined output voltage from the bucking transformer secondary coils would indicate the degree of movement or displacement of the core 22 from its null position. For example, in conventional type differential transformers, movement of the core 22 in one direction produces an output voltage of one phase and movement of the core in the opposite direction produces an output voltage of opposite phase.

The secondary winding 18, illustrative of one form of the present invention, provides means for producing an output voltage from the transformer 10 which is variable from substantially zero to a voltage variable in a single phase throughout the full range of linear core movement. The single ended output voltage may therefore be made substantially double the single ended output voltage achieved by conventional differential transformers. This result is achieved by effectively adding the voltages developed by the secondary coils 16, 18 and 20. The voltage developed across the secondary coil 18 is of such a phase relationship and connected in such a manner with respect to the secondary coils 16 and 20 so as to add with the output voltages which would be developed by the secondary windings 16 and 20 if used alone. By adding the voltage developed across the coil 18 with the output voltage developed across the coils 16 and 20, the null operating position of the core 22 is effectively shifted. The degree of shift in the null operating position of the core 22 is dependent upon the relative values of the voltage across the coil 18 with respect to the voltages across the coils 16 and 20. In a preferred form, the voltage across the coil 18 would be substantially equal to the combined output voltage which would be developed by the coils 16 and 20 alone if when the core 22 were at one end of the linear range. When the voltage developed across the coil 18 is made 180° out of phase with the resultant combined voltage of the coils 16 and 20 at one end of the linear range of the core movement, the null operating position is effectively shifted to provide a greater single ended linear operating range than that obtainable by the conventional differential transformer when the core is moved in a single direction. When the voltage developed by the coil 18 is 180° out of phase and less than the resultant combined voltages of the coils 16 and 20, greater single ended linear range is obtained. When the voltage across the coil 18 is equal to the combined resultant voltage of the coils 16 and 20, twice the single ended linear range of conventional transformers is obtained.

Movement of the core from the new null position produces an output voltage from the secondary coils which may be variable in a single phase throughout the full linear range of the core 22. Thus, in cases where it is desired to measure core movement in a single direction, the useful linear range of the transformer embodying the present invention may be effectively double the useful linear range of conventional types of differential transformers.

The full range of linear operation is generally limited primarily by the relative position of the movable core 22 with respect to the position of the secondary winding 18. The voltage induced in the secondary winding 18 should remain relatively constant. Thus the core stroke or movement should not be so great as to produce a variable voltage in the secondary winding 18. Other factors which limit the degree of core movement for linear operation relates to the position of the core with respect to the coils 16 and 20. These latter factors are common to conventional types of differential transformers and therefore are not considered in detail here.

Figure 2:
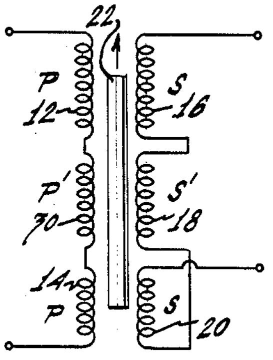
FIGURE 2 is a schematic diagram of an electrical circuit illustrating another form of an electro-magnetic type of transducer, in accordance with the present invention.

Referring particularly to FIGURE 2, the secondary coils 16, 18 and 20 are illustrated in the same electrical relationship as shown in FIGURE 1. An additional primary coil 30 is serially added to the primary coils 12 and 14. In practicing the present invention, the design of some transformers may tend to introduce phasing problems in connection with the voltages developed across the secondary coils 16, 18 and 20. In such cases, it may be desirable to add the primary coil 30 to compensate for these slight differences in phasing which may exist between the output voltages from the three secondary coils 16, 18 and 20. The movement of the core 22 will produce a linear output voltage in substantially the same manner as described in connection with FIGURE 1.

Referring particularly to FIGURE 3, a slightly different arrangement is shown than those shown in FIGURES 1 and 2. Again as in FIGURES 1 and 2 the secondary coils 16, 18 and 20 are shown, in the same electrical relationships. The primary coil 32 comprises a single winding. A capacitor 34 may be connected externally outside the transformer across the secondary winding 18, as indicated by a dotted line. The purpose of this capacitor 34 is to compensate for any difference in phase relationships between the voltage induced in the secondary coil 18 with respect to the voltages induced in the secondary coils 16 and 20.

In many types of transformers embodying the present invention, phasing problems may be of a major consideration. If the voltage induced in the additional secondary coil 18 is not of the proper phase relationship with respect to the voltage across the secondary coils 16 and 20, the combined output voltage from the transformer will tend to be non-linear over a certain range of core movement. With proper transformer design in many situations, additional means for providing phase compensation, such as the capacitor 34, may not be necessary. In other situations, it may be desirable to provide compensating means exterior to the transformer, possibly after assembly of the transformer with other equipment, for example. Various phase adjusting means, other than a capacitor or coil positioning, may of course be employed.

Referring particularly to FIGURE 3*a*, the secondary coils 16 and 18 are wound within the outer annular grooves of the coil form 24. The secondary coil 18 and the primary coil 32 are wound within the center annular groove of the coil form. The coils 18 and 32 are wound concentrically with respect to one another, with the coil 18 being wound closer to the axis of the coil form.

With the coils in positions as shown, an A.C. current flowing in the primary winding 32 will induce voltages in the secondary windings 16, 18 and 20. Due to the relationships of the coils, the number of windings in each of the coils, voltages of the proper values and phase relationships are induced in the secondary coils 16, 18 and 20. The positions and dimensions of the coils are chosen to minimize phasing differences in the induced voltages across the secondary coils. The values of the induced voltages connected in the relationship shown, together with proper phasing, assures a linear output voltage when the core member is moved in a single direction throughout its full linear operating range or throughout substantially more than the single ended linear operating range of conventional differential transformers, dependent on the voltage induced in the secondary coil 18.

Referring particularly to FIGURE 4, the output voltage of a conventional type differential transformer is illustrated. The movement of the core in one direction produces an output voltage in one direction. The movement of the core in the opposite direction produces an output voltage which is substantially 180° out of phase with the first produced voltage. It is seen that the single ended output voltage for one direction of core movement from a null position involves only one half of the full linear range of the differential transformer. In cases where measurements involve movement of the core only in one direction from a null position, one half of the linear range of the transformer is not utilized.

Referring particularly to FIGURE 5, the output voltage of an electro-magnetic transducer embodying the present invention is illustrated. The addition of a voltage associated with the secondary coils of the transformer, in the manner described, effectively shifts the null operating position of the core to make it possible to utilize the full linear range of core movement when measurements involving movement of the core in a single direction from a null position is required. The single ended linear range of a transformer embodying the present invention is therefore substantially double the single ended linear range of conventional differential transformers. Of course, the voltage induced in the secondary winding may be less than that required to provide a single ended full linear range of operation. In these cases, the single ended linear range will still be greater than the single ended linear range obtained from conventional types of differential transformers. As used in the appendant claims, the term "wide linear range" shall be construed to mean a linear range of operation greater than the single ended linear range of conventional differential transformers.

In cases where a wide linear operating range is required, transformers embodying the present invention may be made substantially half the size and weight of transformers of the conventional type made heretofore. The cost of such transformers embodying the present invention is correspondingly reduced over the cost of conventional transformers producing the same linear ranges of operation.

Various different types of designs and modifications of the invention illustrated are of course possible dependent upon the system within which the invention is incorporated.

It is also noted that the core member has been depicted as a hollow rod moving in an axial direction. It is evident that the core member may be of various physical configurations, such as, for example, the type shown in a Patent 2,494,493 issued to H. Schaevitz on January 10, 1950 entitled "Differential Transformer."

What is claimed is:

1. An electro-mechanical transducer comprising a differential transformer, a movable core member associated with said differential transformer, and means associated with said differential transformer to provide a single null operating position for said core member and to provide a linear output voltage variable from substantially zero through substantially the full linear operating range of said transformer when said core member is moved in a single direction.

2. A differential transformer comprising a primary winding, a pair of substantially similar secondary windings connected in series opposition, a movable core disposed to provide a magnetic flux coupling path between said primary winding and said secondary windings, and means associated with said secondary windings to provide a single null operating position of said core and to provide a linear output voltage from said differential transformer variable over substantially the full linear range of said core moved in a single direction.

3. A differential transformer comprising a primary winding, means for applying an alternating current signal to said primary winding, a pair of secondary windings connected in series opposition, a movable core disposed to provide a magnetic flux coupling path between said primary winding and said pair of secondary windings, and an additional secondary winding connected to said pair of secondary windings to provide substantially zero output volts for a single point of operation of said differential transformer and further providing an output voltage variable over substantially the full linear range of said core when said core is moved in a single direction.

4. A differential transformer comprising at least one primary winding, means for applying a signal to said primary winding, a pair of substantially similar secondary windings connected in series opposition to provide a substantially zero output signal at one point of operation of said differential transformer, a movable core disposed to provide a magnetic flux coupling path between said primary winding and said secondary windings, and an additional secondary winding connected to said secondary windings to shift the null operating position of said core and to provide an output voltage from said differential transformer variable over the full linear range of said core moved in a single direction, said additional secondary winding being dimensioned to provide a voltage substantially equal to the resultant voltage of said pair of secondary windings at one end of the linear operating range of said core, said voltage across said additional secondary winding being substantially 180° out of phase with said resultant voltage.

5. An electro-magnetic motion responsive pick-up device comprising a pair of secondary coils and a primary coil, means for applying a signal to said primary coil, a core disposed adjacent said coils, the core and coils being movable relative to each other during actual operation of the device in performing a motion pick-up function, the movement of said core in one direction acting to increase the flux linkage between the primary coil and one of the secondary coils and to decrease the flux linkage with the other secondary coil thereby to produce a net differential voltage across the pair of secondary coils with a magnitude which is a linear function of the displacement of said core, an additional secondary coil, and means for adding a voltage developed across said additional secondary coil to the voltage developed across said pair of secondary coils to provide a single ended linear output voltage from said pick-up device, said single ended linear output voltage being variable from substantially zero through substantially a full linear range of operation.

6. A differential transformer comprising a hollow coil form having three annular grooves, a pair of serially connected primary coils wound within the outer grooves of said coil form, a pair of secondary coils connected in series opposition wound concentrically with said primary coils within said outer grooves of said coil form, an additional secondary coil connected between said pair of secondary coils to provide a single null operating point for said differential transformer and wound within the center annular groove between said outer grooves of said coil form, and a core member disposed within said hollow coil form, said core member being greater than the length of said additional secondary coil and being adapted to move axially within said coil form to vary the flux linkage between said primary coil and said pair of secondary coils.

7. A differential transformer comprising a hollow coil form having three annular grooves, a pair of secondary coils connected in series opposition wound within the outer grooves of said coil form, an additional secondary coil connected between said pair of secondary coils to provide a single null operating point for said differential transformer and wound within the center annular groove between said outer grooves of said coil form, a primary coil wound concentrically with said additional secondary coil within said center annular groove, and a core member disposed within said hollow coil form, said core member being greater than the length of said additional secondary coil and being adapted to move axially within said coil form to vary the flux linkage between said primary coil and said pair of secondary coils.

8. A differential transformer comprising a primary winding, a pair of substantially similar secondary windings connected in series opposition, a movable core disposed to provide a magnetic flux coupling path between said primary winding and said secondary windings, and an additional secondary winding to provide a single null operating position of said core and an output voltage from said differential transformer variable over substantially the full linear range of said core moved in a single direction.

9. A differential transformer as set forth in claim 8 wherein said additional secondary winding is connected to said similar secondary windings to produce a voltage 180° out of phase with a voltage produced by said secondary windings.

10. A differential transformer as set forth in claim 9 wherein additional means are provided to compensate the phase relationship of a voltage produced by said additional secondary winding with respect to a voltage produced by said similar secondary windings.

References Cited in the file of this patent

UNITED STATES PATENTS

| | | |
|---|---|---|
| 2,424,766 | Miner | July 29, 1947 |
| 2,564,221 | Hornfeck | Aug. 14, 1951 |
| 2,568,587 | MacGeorge | Sept. 18, 1951 |
| 2,568,588 | MacGeorge | Sept. 18, 1951 |